(12) United States Patent
Quinn

(10) Patent No.: US 6,984,680 B2
(45) Date of Patent: Jan. 10, 2006

(54) LOW ODOR, LIGHT COLOR HOT PICK-UP ADHESIVE

(75) Inventor: Thomas H. Quinn, St. Paul, MN (US)

(73) Assignee: Adherent Laboratories, Inc., St. Paul, MN (US)

( * ) Notice: Subject to any disclaimer, the term of this patent is extended or adjusted under 35 U.S.C. 154(b) by 95 days.

(21) Appl. No.: 10/823,398

(22) Filed: Apr. 12, 2004

(65) Prior Publication Data

US 2004/0225046 A1 Nov. 11, 2004

Related U.S. Application Data

(60) Provisional application No. 60/462,980, filed on Apr. 15, 2003.

(51) Int. Cl.
*C08K 5/13* (2006.01)

(52) U.S. Cl. ............... 524/323; 524/476; 524/487; 524/488; 524/490

(58) Field of Classification Search ........... 524/323, 524/476, 487, 488, 490
See application file for complete search history.

(56) References Cited

U.S. PATENT DOCUMENTS

| 3,005,565 | A | | 10/1961 | Doane et al. | |
|---|---|---|---|---|---|
| 4,218,294 | A | | 8/1980 | Brack | |
| 5,010,119 | A | * | 4/1991 | McElrath et al. | 523/205 |
| 5,128,397 | A | * | 7/1992 | Horsey et al. | 524/290 |
| 5,939,483 | A | * | 8/1999 | Kueppers | 524/487 |
| 5,985,074 | A | | 11/1999 | Heemann et al. | |
| 6,117,945 | A | * | 9/2000 | Mehaffy et al. | 525/159 |
| 6,172,156 | B1 | * | 1/2001 | Lindquist et al. | 524/505 |
| 6,239,208 | B1 | * | 5/2001 | Halloran et al. | 524/487 |
| 6,653,385 | B2 | * | 11/2003 | Wang et al. | 524/425 |
| 6,657,000 | B1 | * | 12/2003 | De Keyzer et al. | 524/505 |

OTHER PUBLICATIONS

"Carousel Wrap-Around Labeling System," *Nordson Corporation*, 2 pgs (© 2002).
"Nordson Carousel Wrap-Around Labeling System Delivers Precise Adhesive Application For More Consistent Label Application," *Nordson Corporation*, 2 pgs. (Nov. 3, 2002).

* cited by examiner

*Primary Examiner*—Bernard Lipman
(74) *Attorney, Agent, or Firm*—Merchant & Gould P.C.

(57) ABSTRACT

A hot melt label or other paper stock pick-up adhesive can be formulated using a hydrogenated tackifying resin combined with waxes, oils, stabilizers and other additive materials. Such a material has hot tack and other properties that produce excellent pick-up properties. The hot melt materials are hypoallergenic and are safe to use.

22 Claims, No Drawings

LOW ODOR, LIGHT COLOR HOT PICK-UP ADHESIVE

RELATED APPLICATION

This application claims priority under 35 U.S.C. §119(e) to U.S. provisional patent application Ser. No. 60/462,980 filed Apr. 15, 2003, incorporated by reference herein.

FIELD OF THE INVENTION

This invention relates to improved hot pick-up adhesive having little or no tack when cool. The adhesive can be used as a pick-up labeling adhesive composition that uses synthetic hydrocarbon tackifying resins that are low in odor, light in color, and hypoallergenic to obtain excellent adhesive properties combined with improved user safety and comfort.

BACKGROUND OF THE INVENTION

Hot pick-up adhesives are low viscosity hot melt adhesives that exhibit tack at elevated temperature and are substantially tack-free when cool. The adhesive can be applied to containers such as cans or jars, and used to pick up one container label from a stack of labels or a label cartridge in order to initiate the labeling process. The container can be used at low, ambient or elevated temperature.

Current hot pick-up adhesives are made with natural rosin materials. These rosin materials are natural products typically derived from tree or plant sources. The natural rosins are generally polycyclic natural products, carboxylic acids or esters, and are considered to be irritants or materials that can provoke an allergic response in users that come into contact with this material at elevated temperature. These materials, both from their composition and from thermal decomposition by-products, have been known to cause at least irritation and allergic responses from human subjects.

Hot pick-up adhesives are typically used with roll-through labeling machines such as those manufactured by Mateer Burt in Exton, Pa. In the roll-through labeling process, a continuous series of containers are rolled over a small glue pot, heated from about 250° F. to 275° F., and filled with melted hot pick-up adhesive. Rotating wheel applicator disks dip into the pot, pull adhesive out, and apply small dots of adhesive onto the surface of the container as it rolls over the applicator wheels. Other machines can be used but these are used as exemplary of the process. After the dots, lines or other shapes of applied hot pick-up adhesive are formed, the container continues to roll through the labeling machine and rotate until the dots of hot adhesive contact and adhere to the end of the top label in the label cartridge. The hot pick-up adhesive has enough adhesion to the label and enough cohesive strength while still molten to pull the top label from the stack of labels and wrap the label around the container as the container continues to roll through the labeling machine. After the container has made one full rotation, the label will be totally wrapped around the container and adhesively over-lap itself where it is permanently adhered with another adhesive material sealing the label to the container exterior.

The hot pick-up adhesive needs the right balance of fluidity, hot tack, and cohesive strength when it first contacts the label and picks it up from the label cartridge. If it is too fluid it will not have sufficient hot tack to pull the label from the cartridge, but if it has too little fluidity, it will not be able to wet-out and adhere to the label or container. Since hot pick-up adhesives are thermoplastic materials their fluidity and hot tack can change substantially with temperature. The hot pick-up is hot and fluid when it is first applied to the container by the applicator wheels. As the container rotates through the labeling machine the hot pick-up begins to cool and it sets and becomes less fluid and builds hot tack. It is important that the hot pick-up have the correct rate of set so that it has sufficient fluidity and hot tack at whatever temperature it has cooled to when it attempts to pick up the label.

Clearly, a substantial need exists for a high quality hot pick-up adhesive that obtains equal or better adhesive properties than the prior art materials, but also provides a hypoallergenic material that is not an irritant to people who come into contact with the adhesive during adhesive manufacture or container labeling.

BRIEF DISCUSSION OF THE INVENTION

The hot pick-up adhesive materials of the invention comprise a hot melt adhesive having a major proportion of a hydrogenated hydrocarbon resin and an effective amount of a hydrocarbon oil and a wax. The materials, blended at the appropriate amounts obtain a softening point of greater than about 170° F., or 185° F., and a Brookfield Thermocel viscosity using a spindle number SCR-27 of at least 300 cP at 225° F. The Brookfield Thermocel viscosity is at least 250 cP at 275° F. The cohesive strength of the material can be improved using a small, but helpful amount of a polymer such as an EVA, hydrogenated block copolymer or other adhesive-grade polymer. In this regard, about 0.01 to about 10 wt-% of such a polymer added to the material can substantially increase cohesive strength of the material, both in the hot pick-up application and after application to the can after cooling. The adhesive material can also include various conventional additives including dyes, stabilizers, extenders, etc. In the formulations of the invention, the hydrogenated hydrocarbon resin, wax, oil and hydrogenated block copolymer are selected to obtain the optimum adhesive properties of viscosity and tack and to obtain the lowest possible color, irritation and to minimize any allergic response from the materials or from thermal decomposition products of the materials. In this regard, the hydrogenated resins are selected from synthetic hydrogenated resins having little or no olefinic unsaturation remaining in the hydrogenated materials. Thermally stable oils and waxes are also selected to minimize irritation or allergic response. Lastly, the polymer material, preferably the hydrogenated ABA block copolymer is selected to add as no added irritation or allergic response. The adhesive materials of the invention at the typical application temperatures of the container labeling machines have low viscosity, but sufficient tack to enable the containers to remove a single label from the label stack and to fully adhere the label to the container during the labeling procedure. Once cool, the adhesive is colorless, hypoallergenic and has sufficient bonding strength and cohesive strength to maintain the label on the container for the useful life of the container. The hot pick-up adhesives of the invention can be formulated for any currently available hot pick-up labeling machine available on the market. Each machine has its own requirements for viscosity, hot tack and final bond strength.

The hot pick-up adhesives of the invention can be modified for use with virtually any container in use today using the hot pick-up labeling machines of the invention. Such containers can be made from aluminum can stock, steel can stock, paperboard can stock, plastic container materials including common polyester material, polyethylene material, polypropylene material, polystyrene material, etc. Containers typically used in these labeling machines are containers that have a volume up to about 5 liters, typically less than 2 liters, but often in the range of about 0.1 liter to about 2 liters. The containers typically have a circular cross-section due to the need for the container to "roll" through the labeling process.

SUMMARY OF THE INVENTION

The use of hydrogenated synthetic hydrocarbon resins, and compounds thereof can significantly improve upon the properties of hot pick-up compositions while surprisingly providing rate of set and hot tack properties at least as good as rosin. For this invention, hydrogenated synthetic hydrocarbon resins are defined as hydrogenated resins resulting from the controlled chemical reactions such as polyaddition or polycondensation between well-defined reactants that do not themselves have the characteristic of resins. Examples of hydrogenated synthetic hydrocarbon resins include the hydrogenated versions of aromatic $C_9$ resins, aliphatic $C_5$ resins, $C_5/C_9$ blended resins, dicyclopentadiene resins, alpha-methylstyrene resins, and alpha-methylstyrene vinyl toluene resins. The hot pick-up adhesives of the invention comprise a major proportion of a synthetic hydrogenated resin, an effective amount of an oil and a wax combined with other additives. In one embodiment of the invention, the hot pick-up adhesive of the invention can contain a polymer material such as an ABA block copolymer to increase cohesive strength at temperature and on the final cooled label container.

DETAILED DESCRIPTION OF THE INVENTION

The synthetic hydrocarbon resins preferred in this invention include indene-coumarone resins, aromatic $C_9$ resins, aliphatic $C_5$ resins, $C_5/C_9$ blended resins, dicyclopentadiene resins, alpha-methylstyrene resins, and alpha-methylstyrene vinyl toluene resins, polyterpene resins, and hydrogenated versions of each of these. The main source of raw materials for the production of hydrocarbon resins are the pyrolysis of coal in coke ovens, the pyrolysis of petroleum fractions in steam crackers, and terpene monomers mainly derived from naval stores, paper production, and orange peels. More commonly, synthetic hydrocarbon resin monomers are derived from the pyrolysis of natural gas and petroleum refinery streams or byproducts of ethylene and propene production. This so-called steamcracking process results in several fractions used to polymerize synthetic hydrocarbon resins including $C_5$ streams containing linear and cyclic olefins to product aliphatic resins, $C_9$ streams containing unsaturated aromatics to produce aromatic resins, and dicyclopentadiene (DCPD) streams to produce dicyclopentadiene resins. The crude $C_5$ fraction consists of olefins and diolefins such as isoamylene, DCPD, isoprene, and piperylene, which after processing and polymerization produce aliphatic resins. DCPD resin is polymerized from dicyclopentadiene derived as a distillate of $C_5$ fractions. This DCPD fraction may also contain other dienes such as isoprene, butadiene, and methylcyclopentadiene. DCPD resins are commonly hydrogenated to improve color and oxidative stability. A commercial example of hydrogenated DCPD resin is the Escorez® 5380 from ExxonMobil Chemical Company. Aromatic $C_9$ resins are polymerized from monomers in feedstreams containing high boiling (160–200° C.) aromatic distillates such as indene, vinyl toluene, alpha-methylstyrene, styrene, naphthalene, methylindenes, as well as non-reactive aromatics. Commercial examples of aromatic $C_9$ resins include the Norsolene® series from Sartomer Chemical and Escorez® 7312 from ExxonMobil Chemical Company. Pure unsaturated monomers such as styrene, alpha-methylstyrene, and vinyl toluene can be polymerized alone, or as blends with each other to produce aromatic pure monomer resins. An example of such a pure aromatic resin is Kristalex® from Eastman Chemical Company. These pure monomer resins can be further hydrogenated. An example of hydrogenated alpha-methylstyrene resin is the Regalrez® series from Eastman Chemical Company. These examples of synthetic hydrocarbon resins are not meant to limit this invention in any way, but are only meant to illustrate the inventive concept.

These resins are useful in hot pick-up compositions at concentrations ranging from about 30 wt-% to 95 wt-%, preferably from about 50 wt-% to 85 wt-% of the hot pick-up composition. The amount of tackifying resin varies depending upon the degree of desired tack and hardness, and the nature and amount of other modifying additives. Since the material of the invention contains greater than typical amounts of resin and less than the typical amounts of polymer, for a fully formulated polymer containing hot melt, the adhesive of the invention can contain greater than 40 wt-%, greater than 50 wt-%, greater than 60 wt-% or greater than 70 wt-%, of the resin depending on desired properties.

Optionally, oils, plasticizers, or liquid resins are useful at concentrations ranging up to 25 wt-%, often from 0.1 wt-% to 20 wt-%, preferably from 0.2 wt-% to 15 wt-%, and are used to modify tack, rate of set, adhesion, and film forming properties. These include paraffinic and napthenic process oils (Shellflex® 371 from Shell Oil Company), mineral oils (Kaydol® Oil from Crompton Chemical), liquid elastomers including polybutenes (Indopol® from Amoco Chemical Company) and polyisobutylenes (Oppanol® from BASF), benzoate plasticizers, and liquid tackifying resins (Regalrez® 1018 from Hercules Chemical Company).

Optionally, natural and synthetic waxes may be utilized in the present invention at concentrations ranging from 0 wt-% to 25 wt-%, preferably from 0.2 wt-% to 15 wt-%, and are used to modify viscosity, rate of set, open time, and aid processing. These include paraffinic waxes such as Parvan 152 from ExxonMobil Chemical Company, microcrystalline waxes such as Victory Amber from Bareco Products, and synthetic waxes such as Sasolwax H-1 from Sasol and PX-100 from Bareco Products. Examples of natural waxes include waxes derived from soybeans, coconuts, flax, corn, canola, and hydrogenated tallows derived from animal products.

The adhesive can contain an effective amount of a polymer material to improve hardness, cohesive strength and other physical properties. Thermoplastic polymers useful herein include homopolymers, copolymers, and terpolymers of ethylene and rubbery block copolymers. Thermoplastic polymers are useful at concentrations ranging from 0 wt-% to 20 wt-%, from 0.01 wt-% to 10 wt-%, from 0.02 wt-% to 5 wt-%, and are used to modify impact resistance, rate of set, adhesion, and film forming properties.

Copolymers and terpolymers of ethylene are polymers having at least one comonomer selected from the group consisting of vinyl esters of a saturated carboxylic acid wherein the acid moiety has up to 4 carbon atoms, unsaturated mono- or dicarboxylic acids are of 3 to 5 carbon atoms, a salt of the unsaturated acid, esters of the unsaturated acid derived from an alcohol having 1 to 8 carbon atoms, and mixtures thereof, and $C_{3-20}$ alpha-olefins.

Preferred ethylene/unsaturated carboxylic acid, salt and ester interpolymers include ethylene/vinyl acetate (EVA), ethylene/acrylic acid (EEA) and its ionomers, ethylene/methacrylic acid and its ionomers, ethylene/methyl acrylate (EMA), ethylene/n-butyl acrylate (EnBA), ethylene/hexene, ethylene/octene, as well as various derivatives thereof that incorporate two or more comonomers.

Commercial examples of useful polymers include ethylene homopolymers available from Eastman Chemical Co. under the trade name of Epolene®, EVA copolymers available from DuPont in Wilmington, Del. under the trade name of Elvax®, EnBA copolymers available from ExxonMobil Chemical Co. under the trade name of Escorene®, EMA copolymers from ExxonMobil under the trade name of Optema®, and ethylene/hexane copolymers from Exxon-Mobil under the trade name of Exact®.

The rubbery block copolymers include those polymers having the general configuration A-B diblock, A-B-A triblock, A-B-A-B-A-B multiblock, radial block copolymers, and star polymers. Commonly, the A block is styrene and the B block may be butadiene, isoprene, ethylene/butylenes and ethylene/propylene although there are others as well. Examples of useful rubber block copolymers include the Kraton®) G series of styrene-ethylene/butylene-styrene block copolymers, the Kraton® D series of styrene-butadiene-styrene block copolymers, and styrene-butadiene-styrene block copolymers, all available from Kraton Polymers in Houston Tex.

A stabilizer or antioxidant is preferably used in the hot pick-up composition. These compounds are added to protect the hot pick-up from degradation caused by reaction with oxygen and extend the pot life of the adhesive while molten in the applicator. Such antioxidants are commercially available from Ciba-Geigy in Hawthorne, N.Y. and include Irganox 1010 and Irganox 1076 and are hindered phenols. BNX DLTDP® is an example of a thioester type of stabilizer from Mayzo, Inc. These compounds are added in small amounts and have no effect on other physical properties.

Other compounds can be added to effect color, opacity, hardness, and tack. Examples include fillers, pigments, dyes, and odors to name a few. These hot pick-up adhesives can be prepared using high shear mixers, extruders, or upright mixers. Typically the hydrocarbon resins, plasticizers, oils, liquid resins, waxes, polymers, fillers, etc. are heated to about 150° C. and mixed until homogeneous. After the mixture becomes homogeneous, it is typically cooled and formed into a small chunk or pellet using a grinder, shot tower, or similar device. The adhesives of the invention are typically packaged by first blending the adhesive components into a uniform mass and then forming the adhesive into pellets, bricks, or other shapes for further packaging. Such pellets or bricks can be packaged in commonly available paperboard containers. Additionally, the adhesive can be blended until uniform and then placed in a molten form into containers having shape or size appropriate for use in the end use labeling machines.

The following table lists proportions believed to exhibit the needed properties in the adhesives of the invention.

TABLE 1

Typical Formulations

| Raw Material | Useful (wt-%) | Preferred (wt-%) | Most Preferred (wt-%) |
| --- | --- | --- | --- |
| Hydrogenated Resin | 30 to 95 | 40 to 90 | 50 to 85 |
| Oil | 0 to 20 | 0.1 to 18 | 0.2 to 15 |
| Wax or Wax Blend | 0 to 25 | 0.1 to 18 | 0.1 to 15 |
| Polymer | 0 to 15 | 0.01 to 7 | 0.02 to 5 |
| Stabilizer/Additive | 0.01 to 2 | 0.05 to 1 | 0.1 to 0.8 |

A preferred adhesive of the invention contains at least 30 wt % of a hydrogenated synthetic resin, about 0.1 to 20 wt % of a hydrocarbon oil and about 1 to 25 wt % of a wax. In order to improve the cohesive strength of the pick-up adhesive, the material can contain about 0.1 to about 7 wt % of a polymer such as ABA block copolymer, an ethylene vinyl acetate polymer, or other typical adhesive polymers. A second preferred hot melt pick-up adhesive can comprise at least 70 to 85 wt % of a hydrogenated synthetic resin, about 5 to 12 wt % of a hydrocarbon oil and about 6 to 15 wt % of a wax.

Containers that can be used in the labeling machines with the hot pick-up adhesives of the invention are containers typically having a circular cross-section and a volume that ranges from about 0.1 liter to about 2 liters and often as much as 5 liters. The containers that can be labeled in the context of this invention include bottles, cans, drums, tubes, cartridges, tubs, trays, etc. The containers can be manufactured from paper or paperboard materials that can be formed into a circular or substantially circular shape. Some shapes that can depart from the circular cross-section include truncated cone-shaped containers, containers having an oval cross-section. As long as these cross-sectional shapes do not depart from circular and can be used in the machine, they can be used in the invention. Additionally, metal containers can be used such as aluminum cans or containers, stainless steel or coated steel containers. Additionally, the containers can comprise a thermoplastic material including polyethylene terephthalate, polycarbonate, polyethylene, polypropylene, polyvinyl chloride or polystyrene container.

The most common label used in the labeling adhesive of the invention can consist typically of paper, foil or thermoplastic stock. Thermoplastic materials that can be used in the invention include polyethylene, polypropylene, polystyrene, foamed polystyrene, expanded polystyrene, polyvinyl chloride, or natural products such as rayon or cellophane. Film labels can be used based on polyolefin materials. Often the labels of the invention are typically based on paper stock of varying thicknesses, coatings, and dye content in the graphic portion. Such labels can include blank paper or paper stock, craft paper, bleached white paper, etc., papers coated with inorganic and organic coatings, papers having a substantial calendared or surface finish, high gloss paper stock, aluminized or otherwise metallalized paper coatings or aluminized or metallized polymer film labels. The labels are typically provided in stacks of large numbers of labels and the labels are sized to match the circumferential diameter of the container.

There are several factors that control the rate of cooling and subsequent temperature the hot pick-up is at when it contacts the label. These include the initial application temperature, ambient temperature, temperature of the container, diameter of the container, and speed of the container line. Perhaps the most important of these is the container temperature since the temperature can range from very cold containers fresh from refrigeration (−5° to 5° C.) to very hot containers fresh from a cooker (95° to 115° C.). Because there is such a variety of factors and range of temperature conditions that control the hot pick-up cooling rate, it is important to be able to provide different hot pick-up compositions that have different rates of set. Once the invention is understood, the viscosity and tack can be adjusted for the container temperature with little experimentation.

The desirable characteristics of a hot pick-up adhesive include: A relatively low melt viscosity typically ranging from 100 cP to 950 cP or 150 cP. to 500 cP.—a Brookfield Thermocel viscosity using spindle number SCR-21 at 225° F. to 250° F. If the viscosity is too high, the rotating wheel applicators will carry too much adhesive that causes overapplication and throwing of adhesive from the machine rotating parts; An extended and controllable rate of set with the ability to pick up labels over a wide temperature range. In these adhesives, the tack of the adhesive remains for at least 30, or in certain cases up to 60 seconds, after application at a temperature of greater than 200° F.; A light color. Most labels are made from paper and dark hot pick-ups can cause an unsightly stain if they bleed through the label. The color is characterized by a molten Gardner color less than 2, a hard, tack free form at room temperature to facilitate manufacturing the hot pick-up into free flowing pellets or chunks, low odor and fumes. Hot pick-ups are applied with hot glue pots that are open to the environment. It is desirable to use hot pick-ups that minimize the need for expensive ventilation systems and to minimize health risks.

Hot pick-up adhesives of the invention based on hydrogenated synthetic hydrocarbon resin compositions provide useful and desirable properties. They are hypoallergenic compared to rosin based hot pick-ups. They contain relatively small amounts of volatile compounds and do not smoke and cause odor problems compared to rosin based hot pick-ups. They are hydrophobic and resist the absorption of water so they tend not to foam in the applicator pot as compared to rosin based hot pick-ups. They are chemically inert and resist corroding applicator equipment surfaces. They are nearly colorless and tend not to stain paper labels relative to rosin based hot pick-ups.

Conventional hot pick-ups are typically based on natural product rosin products at amounts in excess of 60%, in combination with various natural and synthetic waxes, oils, small amounts of polymers, and have been in use since before 1970. Rosin is a hard, brittle, naturally occurring substance derived from 1) the distillation of oil of turpentine, which is itself derived from pine trees, 2) as a by-product of paper manufacture, and 3) the solvent extraction of pine stumps. Rosin is primarily comprised of abietic acid, derivatives and isomers of abietic acid, and numerous other naturally occurring compounds. There are two primary reasons that rosin has traditionally been the base of hot pick-up adhesives. First, it is a relatively low molecular weight tackifying resin with a very low melt viscosity which makes it possible to make hot pick-ups with melt viscosities in the 150 cP to 500 cP range at 250° F. Second, rosin has a relatively low softening point and a tendency to set up slowly that gives the hot pick-up a desirably long and extended rate of set.

At the same time, rosin has several undesirable characteristics. Rosin is a naturally derived material that causes severe allergic reactions in susceptible people. Rosin contains many low molecular weight materials that are volatile and cause excess smoke and odor at application temperatures. Rosin based hot pick-up adhesives typically require extra-ordinary ventilation systems to ensure worker comfort and safety. Rosin is amber in color and darkens with time at application temperature. The dark color of rosin contributes to its potential to cause unsightly staining of paper labels. Rosin is hydrophilic and absorbs water. Rosin can absorb water during the cooling phase of it manufacturing process or because of humid ambient conditions. Rosin that contains water can foam and splatter when it is heated in an application pot that can be a safety hazard. Rosin is an organic acid and can corrode applicator pots and parts that are not specifically designed to resist corrosion.

Despite these substantial differences from rosin, these hydrogenated synthetic hydrocarbon resins unexpectedly provide a low melt viscosity and the extended rate of set of rosin based hot pick-ups. In addition, hydrogenated synthetic hydrocarbon resins are made by polymerizing monomers in a highly controlled reaction thus minimizing variations associated with naturally occurring substances such as rosin.

EXPERIMENTAL

The Examples are a water-white, low odor, hypoallergenic hot melt adhesive designed for use as a labeling pick-up adhesive. It is designed to replace pick-ups based on gum rosin and to reduce the odor and allergenic problems associated with rosin. The adhesives were made by heating the resins, oils, waxes, and stabilizers at 300 F until melted. Once melted the adhesive is mixed with a low shear agitator until homogeneous. Polymers such as EVA and block copolymers are slowly added during the agitation phase until thoroughly mixed.

TABLE 2

| Raw Material | Material Type | Example 1 (Wt-%) | Example 2 (Wt-%) |
|---|---|---|---|
| Escorez 5380 | Hydrogenated DCPD resin (ExxonMobil). | 77.9 | 77.9 |
| Kaydol mineral oil | Crompton | 10.0 | 8.0 |
| Nat 180 | Soybean wax (Marcus Chemical) | 10.0 | 10.0 |
| PX-100 | Synthetic wax (Bareco) | 2.0 | 2.0 |
| Kraton G-1562 | Hydrogenated S(EB)S (Kraton Polymers) | — | 2.0 |
| Irganox 1010 | Stabilizer (Ciba-Geigy) | 0.1 | 0.1 |

Examples 1 and 2 are water-white, low odor, high tack, hypoallergenic hot melt adhesives designed for use as labeling pick-up adhesives. They are designed to replace pick-ups based on gum rosin and to reduce the odor and allergenic problems associated with rosin.

EXAMPLE 1

Physical Properties

| | |
|---|---|
| Physical appearance | White solid |
| Molten Gardner Color | 1 |
| Viscosity (Thermocel) | 410 cps @ 225° F. |
| | 175 cps @ 250° F. |
| Softening Point (Mettler) | 176° F. |
| Typical Application Temperature | 225–275° F. |

EXAMPLE 2

Physical Properties

| | |
|---|---|
| Physical appearance | White solid |
| Molten Gardner Color | 1 |
| Viscosity (Thermocel) | 950 cP @ 225° F. |
| | 380 cP @ 250° F. |
| Softening Point (Mettler) | 185° F. |
| Typical Application Temperature | 225–275° F. |

The above specification, examples and data provide a complete description of the manufacture and use of the composition of the invention. Since many embodiments of the invention can be made without departing from the spirit and scope of the invention, the invention resides in the claims hereinafter appended.

I claim:

1. A hot melt pick-up adhesive exhibiting hot tack properties, the adhesive consisting essentially of:
    (a) at least 30 wt-% of a hydrogenated synthetic resin;
    (b) about 0.1 to 20 wt-% of a hydrocarbon oil; and
    (c) about 0.1 to 25 wt-% of a wax; the percentages based on the adhesive wherein the adhesive has a Gardner Color of less than 3, a Mettler softening point at least 150° F.; and a Brookfield Thermocel viscosity using spindle number SCR-27 of at least 300 cP at 225° F.

2. The adhesive of claim 1 wherein the adhesive additionally comprises a hindered phenol stabilizer.

3. The adhesive of claim 1 wherein the adhesive comprises 40 to 90 wt-% of a resin comprising a resin selected form the group consisting of an aromatic $C_9$ resin, an aliphatic $C_5$ resin, a $C_5/C_9$ blended resin, a dicyclopentadiene resin, an alpha-methylstyrene resin, an alpha-methylstyrene/vinyl toluene resin and mixtures thereof, 0.1 to 18 wt-% oil and 0.1 to 18 wt-% wax.

4. The adhesive of claim 1 wherein the adhesive comprises 50 to 85 wt-% resin, 0.2 to 15 wt-% oil and 0.2 to 15 wt-% wax.

5. A hot melt pick-up adhesive exhibiting hot tack properties, the adhesive comprising:
    (a) at least 70 to 85 wt-% of a hydrogenated synthetic resin comprising a resin selected form the group consisting of an aromatic $C_9$ resin, an aliphatic $C_5$ resin, a $C_5/C_9$ blended resin, a dicyclopentadiene resin, an alpha-methylstyrene resin, an alpha-methylstyrene/vinyl toluene resin and mixtures thereof;
    (b) about 5 to 12 wt-% of a hydrocarbon oil; and
    (c) about 6 to 15 wt-% of a wax; the percentages based on the adhesive wherein the adhesive has a Gardner Color of less than 3, a Mettler softening point at least 150° F.; and a Brookfield Thermocel viscosity using spindle number SCR-27 of at least 250 cP at 225° F.

6. The adhesive of claim 5 wherein the adhesive additionally comprises a hindered phenol stabilizer.

7. A hot molt pick-up adhesive exhibiting hot tack properties, the adhesive comprising:
    (a) at least 30 wt-% of a hydrogenated synthetic resin comprising a resin selected form the group consisting of an aromatic $C_9$ resin, an aliphatic $C_5$ resin, a $C_5/C_9$ blended resin, a dicyclopentadiene resin, an alpha-methylstyrene resin, an alpha-methylstyrene/vinyl toluene resin and mixtures thereof;
    (b) an effective, cohesive strength improving, amount comprising about 0.2 to 5 wt. % of a polymer;
    (b) about 0.1 to 20 wt-% of a hydrocarbon oil; and
    (c) about 0.1 to 25 wt-% of a wax; the percentages based on the adhesive wherein the adhesive has a Gardner Color of less than 3, a Mettler softening point at least 150° F.; and a Brookfield Thermocel viscosity using spindle number SCR-27 of at least 300 cP at 225° F.

8. The adhesive of claim 1 wherein the adhesive additionally comprises a hindered phenol stabilizer.

9. The adhesive of claim 1 wherein the adhesive additionally comprises about 0.01 hydrogenated block copolymer.

10. The adhesive of claim 1 wherein the adhesive comprises 40 to 90 wt % resin, 0.1 to 18 wt-% oil and 0.1 to 18 wt-% wax.

11. The adhesive of claim 1 wherein the adhesive comprises 50 to 85 wt % resin, 0.2 to 15 wt-% oil and 0.2 to 15 wt-% wax.

12. A method of forming a label on a substantially cylindrical container using a hot melt pick-up adhesive exhibiting hot tack properties, the method comprises
    (i) forming an adhesive layer on the container to form a container with an adhesive; and
    (ii) moving the container with an adhesive to a label stack to pick up a label on to the container;
    wherein the adhesive consists essentially of:
    (a) at least 30 wt-% of a hydrogenated synthetic resin;
    (b) about 0.1 to 20 wt-% of a hydrocarbon oil; and
    (c) about 0.1 to 25 wt-% of a wax; the percentages based on the adhesive wherein the adhesive has a Gardner Color of less than 3, a Mettler softening point at least 150° F.; and a Brookfield Thermocel viscosity using spindle number SCR-27 of at least 300 cP at 225° F.

13. The method of claim 12 wherein the adhesive additionally comprises a hindered phenol stabilizer.

14. The method of claim 12 wherein the adhesive additionally comprises 40 to 90 wt-% of a resin comprising a resin selected form the group consisting of an aromatic $C_9$ resin, an aliphatic $C_5$ resin, a $C_5/C_9$ blended resin, a dicyclopentadiene resin, an alpha-methylstyrene resin, an alpha-methylstyrene/vinyl toluene resin and mixtures thereof, 0.1 to 18 wt-% oil and 0.1 to 18 wt-% wax.

15. The adhesive of claim 12 wherein the adhesive additionally comprises 50 to 85 wt-% resin, 0.2 to 15 wt-% oil and 0.2 to 15 wt-% wax.

16. The method of claim 12 wherein the adhesive consists essentially of:
    (a) at least 70 to 85 wt-% of a hydrogenated synthetic resin comprising a resin selected form the group consisting of an aromatic $C_9$ resin, an aliphatic $C_5$ resin, a $C_5/C_9$ blended resin, a dicyclopentadiene resin, an alpha-methylstyrene resin, an alpha-methylstyrene/vinyl toluene resin and mixtures thereof;
    (b) about 5 to 12 wt-% of a hydrocarbon oil; and
    (c) about 6 to 15 wt-% of a wax; the percentages based on the adhesive wherein the adhesive has a Gardner Color of less than 3, a Mettler softening point at least 150° F.; and a Brookfield Thermocel viscosity using spindle number SCR-27 of at least 250 cP at 225° F.

17. The method of claim 16 wherein the adhesive additionally comprises a hindered phenol stabilizer.

18. A method of forming a label on a substantially cylindrical container using a hot melt pick-up adhesive exhibiting hot tack properties, the method comprises
    (i) forming an adhesive layer on the container to form a container with an adhesive and
    (ii) moving the container with an adhesive to a label stack to pick up a label on to the container;

wherein the adhesive comprises:

(a) at least 30 wt-% of a hydrogenated synthetic resin;

(b) an effective cohesive strength improving amount comprising about 0.2 to 5 wt. % of a polymer;

(b) about 0.1 to 20 wt-% of a hydrocarbon oil; and (c) about 0.1 to 25 wt-% of a wax; the percentages based on the adhesive wherein the adhesive has a Gardner Color of less than 3, a Mettler softening point at least 150° F.; and a Brookfield Thermocel viscosity using spindle number SCR-27 of at least 300 cP at 225° F.

19. The method of claim 18 wherein the adhesive additionally comprises a hindered phenol stabilizer.

20. The adhesive of claim 18 wherein the adhesive additionally comprises about 0.01 to 10 wt-% of a hydrogenated block copolymer.

21. The adhesive of claim 18 wherein the adhesive additionally comprises 40 to 90 wt-% of a resin comprising a resin selected from the group consisting of an aromatic $C_9$ resin, an aliphatic $C_5$ resin, a $C_5/C_9$ blended resin, a dicyclopentadiene resin, an alpha-methylstyrene resin, an alpha-methylstyrene/vinyl toluene resin and mixtures thereof, 0.1 to 18 wt-% oil and 0.1 to 18 wt-% wax.

22. The adhesive of claim 18 wherein the adhesive additionally comprises 50 to 85 wt-% resin, 0.2 to 15 wt-% oil and 0.2 to 15 wt-% wax.

* * * * *

UNITED STATES PATENT AND TRADEMARK OFFICE
CERTIFICATE OF CORRECTION

PATENT NO. : 6,984,680 B2
APPLICATION NO. : 10/823398
DATED : January 10, 2006
INVENTOR(S) : Quinn It is certified that error appears in the above-identified patent and that said Letters Patent is hereby corrected as shown below:

Col. 9, line 34, claim 3: "form the group" should read --from the group--

Col. 9, line 45, claim 5: "form the group" should read --from the group--

Col. 9, line 58, claim 7: "hot molt pick-up" should read --hot melt pick-up--

Col. 9, line 61, claim 7: "form the group" should read --from the group--

Col. 10, line 37, claim 14: "form the group" should read --from the group--

Col. 10, line 48, claim 16: "form the group" should read --from the group--

Signed and Sealed this

Twenty-fifth Day of July, 2006

JON W. DUDAS
*Director of the United States Patent and Trademark Office*